(12) United States Patent
Ward et al.

(10) Patent No.: US 8,734,279 B2
(45) Date of Patent: May 27, 2014

(54) TENSIONER

(75) Inventors: Peter Ward, Farmington Hills, MI (US);
Juergen Hallen, Aachen (DE); Holger Schever, Stolberg (DE)

(73) Assignee: Gates Corporation, Denver, CO (US)

( * ) Notice: Subject to any disclaimer, the term of this patent is extended or adjusted under 35 U.S.C. 154(b) by 189 days.

(21) Appl. No.: 13/155,557

(22) Filed: Jun. 8, 2011

(65) Prior Publication Data

US 2012/0316019 A1    Dec. 13, 2012

(51) Int. Cl.
*F16H 7/10* (2006.01)

(52) U.S. Cl.
USPC .......................................... 474/112; 474/135

(58) Field of Classification Search
USPC .......... 474/101, 109, 112, 117, 135, 138, 139
See application file for complete search history.

(56) References Cited

U.S. PATENT DOCUMENTS

| | | | |
|---|---|---|---|
| 4,473,362 A | 9/1984 | Thomey et al. | |
| 4,557,709 A | 12/1985 | St. John | |
| 4,689,037 A | 8/1987 | Bytzek | |
| 4,950,207 A | 8/1990 | Henderson | |
| 4,957,471 A | 9/1990 | St. John | |
| 5,064,405 A | 11/1991 | St. John | |
| 5,244,438 A * | 9/1993 | Golovatai-Schmidt | 474/112 |
| 5,255,761 A * | 10/1993 | Zaremsky | 188/71.5 |
| 5,919,107 A | 7/1999 | Stepniak | |
| 5,993,340 A | 11/1999 | Rocca et al. | |
| 6,422,963 B2 | 7/2002 | Kurose | |
| 6,592,482 B2 | 7/2003 | Serkh | |
| 7,951,030 B2 * | 5/2011 | Ward et al. | 474/112 |
| 2008/0058143 A1 | 3/2008 | Fukuda | |
| 2008/0171622 A1 | 7/2008 | Schever | |
| 2010/0144473 A1 * | 6/2010 | Ward et al. | 474/112 |

FOREIGN PATENT DOCUMENTS

| | | |
|---|---|---|
| CH | 681910 A5 | 6/1993 |
| GB | 2102097 A | 1/1983 |
| GB | 2249152 A | 4/1992 |
| WO | 03048606 A1 | 6/2003 |
| WO | 2006111988 A1 | 10/2006 |
| WO | 2007036959 A1 | 4/2007 |
| WO | 2007036960 A1 | 4/2007 |

* cited by examiner

*Primary Examiner* — Michael Mansen
*Assistant Examiner* — Juan Campos, Jr.
(74) *Attorney, Agent, or Firm* — Jeffrey A. Thurnau, Esq.; Paul N. Dunlap, Esq.

(57) ABSTRACT

A tensioner comprising a sleeve, an adjuster cooperatively engaged with an inner surface of the sleeve, a pivot arm pivotally engaged with the sleeve, a pulley journalled to the pivot arm, a torsion spring engaged with the sleeve for urging the pivot arm, an elastomeric damping ring connected to the arm and in compressive frictional contact between the sleeve and the arm whereby a tangential friction force damps a pivot arm movement, the elastomeric damping ring exerting a radial force on the sleeve, and a retaining member connected to the adjuster and cooperatively engaged with the sleeve whereby the adjuster and sleeve are kept in a predetermined relation.

7 Claims, 3 Drawing Sheets

TENSIONER

FIELD OF THE INVENTION

The invention relates to a tensioner, and more particularly, a tensioner comprising friction damping for use in oil using an elastomeric damping ring friction element having a friction force and a retaining member connected to an adjuster and cooperatively engaged with the sleeve whereby the adjuster and sleeve are kept in a predetermined relation.

BACKGROUND OF THE INVENTION

The two most common means of transmitting power from a crankshaft for synchronously driving rotating members, such as cam shafts and balance shafts, are timing chains and belts. Timing chains require engine oil to operate. In comparison most timing belt applications require that no oil be present in the belt drive as the presence of oil can damage the belt and inhibit its intended purpose. Recent improvements in belts no longer require that a belt be sealed from the engine oil environment.

The recent improvement of belts to operate in oil, however poses other problems that need to be solved. One specific problem is properly tensioning the belt drive to keep the camshaft synchronized with the crankshaft. Should the camshaft or other synchronized driven crankshaft component no longer be properly synchronized with the crankshaft; catastrophic engine damage can result.

To transmit power through the belt from the rotating crankshaft one side of the belt is pulled around the crankshaft and is commonly referred to as the belt tight side by those skilled in the art. Conversely the other side is referred to as the belt slack side, since the belt is being pushed away from the crankshaft. It is important to provide tensioning to the slack side of the belt to prevent the belt from becoming unduly slack and thus causing a loss of synchronization between the crankshaft and the components rotated by the crankshaft. This loss of synchronization is commonly referred to as "tooth jump" or "ratcheting" by those skilled in the art.

Compounding the problem of eliminating belt slack to prevent "tooth jump" or "ratcheting" is excessive tensioner arm motion or vibration induced by the engine's angular vibration. Excessive arm motion could not only lead to a "tooth jump" or a "ratcheting" condition, but can also reduce the useful life of the tensioner and the belt as well. To minimize the amount of arm vibration; friction damping is commonly used to prevent the tensioner from moving away from the belt.

The presence of oil makes friction damping difficult to achieve. One can appreciate that the application of a lubricant to two rubbing surfaces will allow relative motion between the two surfaces to occur more easily.

The important aspect of friction damping is the resistant torque generated by friction damping to resist the motion of the arm away from the belt. It is desirable to only have asymmetric damping where the arm motion is resisted only when the tensioner moves away from the belt and not towards the belt as in the prior art for tensioners that operate in a dry environment.

Representative of the art is U.S. Pat. No. 5,919,107 which discloses a A belt tensioner for tensioning a drive belt or timing belt comprises an eccentric adjusting member having an end surface thereof constructed and arranged to be mounted directly in surface-to-surface engagement with respect to a belt tensioner mounting surface for an engine frame. A pivoted structure is mounted on the eccentric adjusting member for pivoted movement between a first position and a second position, and a belt tensioning pulley is mounted for rotational movement on the pivoted structure. A coil torsion spring is constructed and arranged to resiliently bias the pivoted structure in a belt tightening direction away from the first position and toward the second position, the eccentric adjusting member being movable during an installation procedure to move the pivoted structure against the bias of the coil torsion spring into a position wherein the belt tensioning pulley is disposed in predetermined static tensioning relation with the belt, at which point the eccentric adjusting member is to be manually fixed. The end surface of the eccentric adjusting member is in sliding surface-to-surface relation with the mounting surface during rotation of the eccentric adjusting member.

What is needed is a tensioner comprising friction damping for use in oil using an elastomeric damping ring friction element having a friction force and a retaining member connected to an adjuster and cooperatively engaged with the sleeve whereby the adjuster and sleeve are kept in a predetermined relation. The present invention meets this need.

SUMMARY OF THE INVENTION

The primary aspect of the invention is to provide a tensioner comprising friction damping for use in oil using an elastomeric damping ring friction element having a friction force and a retaining member connected to an adjuster and cooperatively engaged with the sleeve whereby the adjuster and sleeve are kept in a predetermined relation.

Other aspects of the invention will be pointed out or made obvious by the following description of the invention and the accompanying drawings.

The invention comprises a tensioner comprising a sleeve, an adjuster cooperatively engaged with an inner surface of the sleeve, a pivot arm pivotally engaged with the sleeve, a pulley journalled to the pivot arm, a torsion spring engaged with the sleeve for urging the pivot arm, an elastomeric damping ring connected to the arm and in compressive frictional contact between the sleeve and the arm whereby a tangential friction force damps a pivot arm movement, the elastomeric damping ring exerting a radial force on the sleeve, and a retaining member connected to the adjuster and cooperatively engaged with the sleeve whereby the adjuster and sleeve are kept in a predetermined relation.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

In the prior art friction damping is generated by a bushing based on the radial load applied to the bushing by the belt and the bushing's coefficient of friction. The difference between the inventive tensioner and the prior art is that a rubber damping ring 7 is used instead of a bushing to create enhanced damping. This improvement allows the tensioner to generate friction damping when operating in an oil environment, where otherwise the presence of the lubricant would significantly diminish frictional damping.

The tensioner comprises an asymmetrically damped belt tensioner that can function in an oil saturated environment. Operating with a normal force that is directed in a radial direction permits damping to increase as a force is applied to the tensioner by a belt, and conversely, the damping force decreases as the belt force (or load) decreases, thereby allowing the tensioner to more efficiently follow the belt. The difference in the damping force between the loading stroke (greater) and the unloading stroke (lesser) is characterized as "asymmetric".

Figure 1:
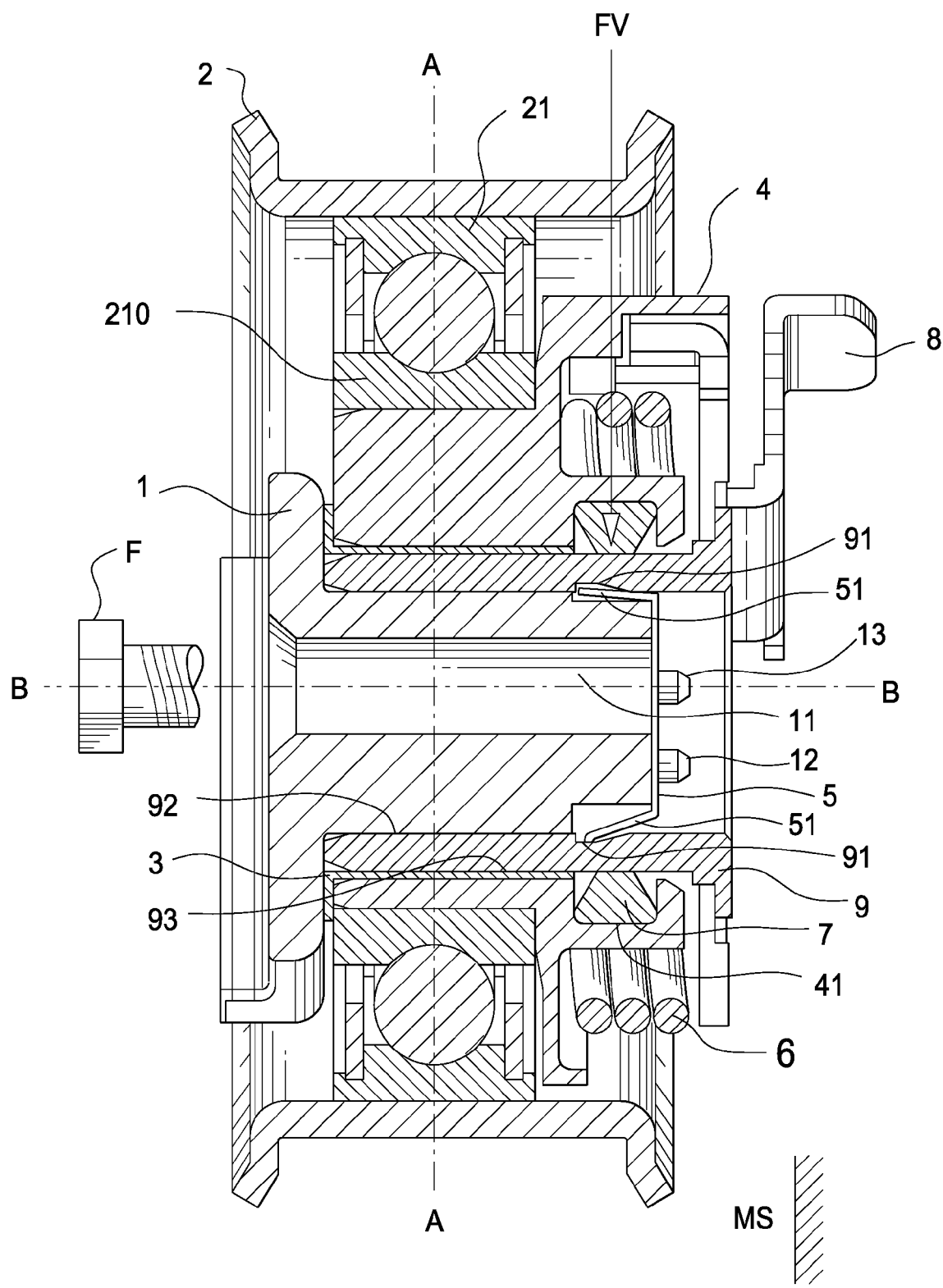
FIG. 1 is a cross-section of the tensioner.

FIG. 1 is a cross-section view of the tensioner. Tensioner 100 comprises an adjuster 1. A double eccentric tensioner comprises two separate arms to load the belt. The first eccentric is the adjuster 1 that is used to precisely load the belt with a predefined tension by compensating for all component tolerances. This first eccentric or adjuster is used only during belt installation and is locked in place once the belt is installed.

The second eccentric is arm 4 which is biased by a torsion spring 6 to urge the idler pulley 2 into a belt. The arm 4 allows the tensioner to compensate for the change in belt length as the belt stretches over time and as the drive length changes size and length through thermal expansion. The arm 4 pivots about a bushing 3 mounted in between the arm 4 and a sleeve 9.

As mentioned previously, adjuster 1 is an eccentric used to install the tensioner into a belt drive system. Adjuster 1 is rotated to move the tensioner in an axis A-A with respect to the belt drive in order to load the tensioner against the belt with a predetermined tension. Once the tensioner position is adjusted, adjuster 1 is locked in place with sleeve 9 using a fastener F or another suitable fastener known in the art. Fastener F is engaged through a bore 11 with an engine surface.

Arm 4 pivots within sleeve 9 by engagement with an inner sleeve surface 92. Indicator 41 cooperates with indicator 81 on base 8. The relative position of indicator 41 with respect to indicator 81 gives a visual indication of the tensioner belt load. Typically, indicator 41 is centered on indicator 81.

Pulley 2 engages a belt to provide tension. Pulley 2 rotates about a bearing 21. Bearing 21 comprises a ball bearing as shown, but could also use a needle bearing or other suitable bearing known in the art.

Bushing 3 allows pivot arm 4 to smoothly pivot about sleeve 9. Sleeve 9 is rigidly connected to base 8. Bushing 3 creates some friction damping through its frictional engagement with sleeve 9 and arm 4 to prevent excessive tensioner motion of arm 4 that is induced by the engine's angular vibration. However, the majority of the damping is accomplished by action of damping ring 7.

Arm 4 is connected to the bearing inner race 210 by a press fit. Arm 4 is urged against the belt by a torsion spring 6. End 61 of spring 6 engages slot 42 of arm 4. Spring 6 is also connected to base 8, which is statically connected to the engine. End 62 of spring 6 engages tab 82 of base 8. The torque from spring 6 and the effective arm length of arm 4 is used to create belt tension.

Damping ring 7 creates friction damping between arm 4 and sleeve 9. Damping ring 7 comprises a torroidal form. Damping ring 7 comprises a predetermined coefficient of friction to generate damping and further acts as a seal against sleeve 9 to minimize the amount of oil between the sleeve and the damping ring 7. Surface 71 frictionally engages sleeve 9. A resistant torque or drag is created by damping ring 7 as surface 71 frictionally moves upon sleeve 9. Surface 72 is fixedly connected to arm 4 in recess 41. The axial width of surface 71 (in direction B-B) may be selected by a user to generate a desired level of damping.

Damping ring 7 is installed on arm 4 and moves with arm 4. Damping ring 7 comprises any natural or synthetic rubber or any combination thereof including but not limited to EVA (ethylene vinyl acetate), ACSM (acsium alkylated chlorosulfonated polyethylene), EEA (Vamac, ethylene/acrylic), FKM (fluoro elastomers), CR (Neoprene or polychloroprene), ECO (epichlorohydrin ethylene oxide), NBR (nitrile), MQ (silicone rubber) FVMQ (fluorosilicone rubber), CSM (chlorosulfonated polyethylene), CPE (chlorinated polyethylene), FFKM (perfiuroelastomer), OT or EDT (polysulfide), AU (polyester), EV (polyether), urethanes, PZ (phosphazene).

A friction force operating tangentially to surface 93 of sleeve 9 is developed by a compressive (normal) force exerted by the damping ring against sleeve 9 in a radial direction "FV". The radial direction FV is normal to an axis of rotation B-B for the pulley. Damping ring 7 is compressed between arm 4 and sleeve 9. By way of example and not of limitation, an operation condition includes a temperature range of −40° C. up to 100° C. An initial frictional torque exerted by the damping ring 7 is approximately 1.1 Nm, which is equivalent to a 50% damping factor, $\zeta$. Of course, the frictional torque exerted by the damping ring 7 may be adjusted as required by a user. The tensioner and damping sleeve 7 operate in internal combustion engine lubricating oil.

Sleeve 9 is statically fixed to the engine or other mounting surface which minimizes the amount of tensioner arm motion thereby preventing "tooth jump" or "ratcheting". The amount of damping or resistant torque is dependent upon the hubload force applied to pulley 2 by the belt, and the amount of compression of damping ring 7 between arm 4 and sleeve 9.

Retainer 5 engages tabs 12, 13 and is used to retain adjuster 1 in the tensioner assembly for shipping. Retainer 5 axially locks adjuster 1 to sleeve 9. Tabs 51 engage detents 91 in sleeve 9.

Figure 2:
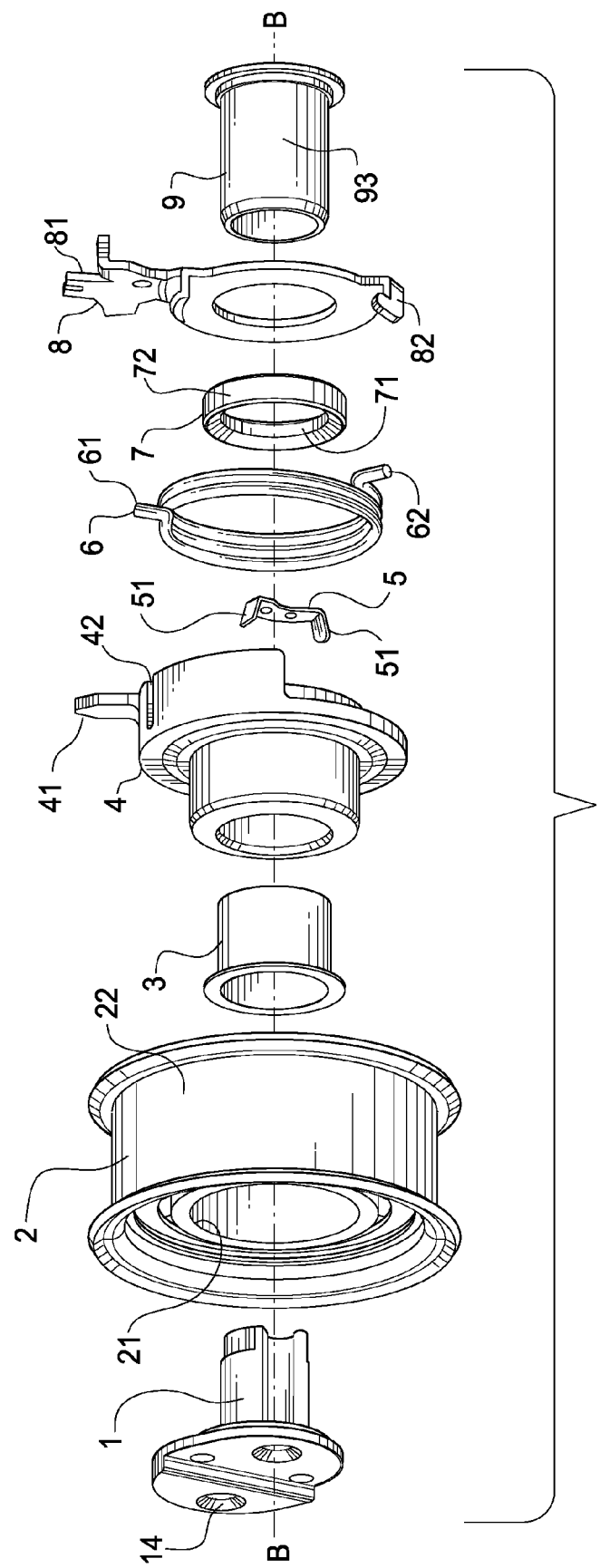
FIG. 2 is an exploded view of the tensioner.

FIG. 2 is an exploded view of the inventive tensioner.

Tabs 51 are spring loaded in a radially outward projecting direction. Engagement of tabs 51 with detents 91 holds the assembled tensioner together before it is installed in it operational location. Namely, sleeve 9 is connected to adjuster 1 by action of the direction in which tabs 51 project. Tabs 51 positively engage detents 91 in a manner which prevents sleeve 9 from being withdrawn from engagement with adjuster 1, thereby capturing pivot arm 4, bushing 3 and damping ring 7 therebetween.

Surface 22 of pulley 2 is shown as flat, however, any suitable profile known in the art may be used including toothed, flat or multiple-ribbed.

Receiving portion 14 receives a tool for installation of the tensioner. To install, a fastener F is inserted into bore 11 and engaged with a mounting surface MS. Before the fastener is given a final torque, a tool is inserted into portion 14. Adjuster 1 is turned about fastener F until the desired pivot arm 4 position and belt load is achieved. The fastener is then torqued to its final installed value.

Figure 3:
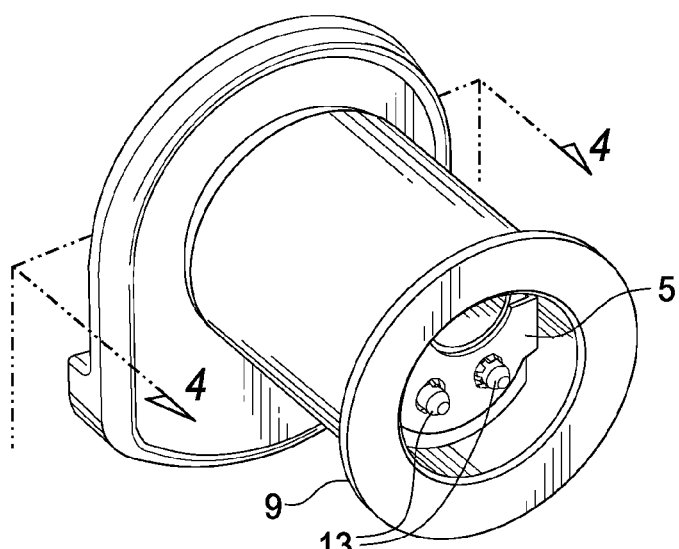
FIG. 3 is an end perspective view of the adjuster and sleeve showing a retainer.

FIG. 3 is an end perspective view of the adjuster and sleeve showing a retainer. Retainer 5 is connected to an end of adjuster 1. Tangs 51 extended about a perimeter of a hole. Projections 53 from retainer 5 grip each tab 13 extending from a base of adjuster 1, see FIG. 5.

Figure 4:
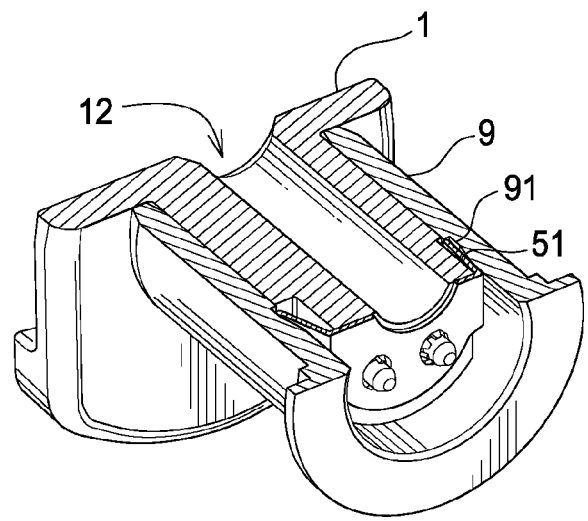
FIG. 4 is a cross section 4-4 of FIG. 3.

FIG. 4 is a cross section 4-4 of FIG. 3. Each extending member 51 is spring loaded and is normally disposed radially outwardly from the adjuster body. During installation, each member 51 is pressed inward toward adjuster 1 by sleeve 9 as adjuster 1 is inserted into sleeve 9. Once adjuster 1 is fully inserted, each member 51 deploys outwardly, compared to a normal (N) extending from the retainer body, to engage a groove 91. Once outwardly deployed each member 51 prevents adjuster 1 from being extracted from sleeve 9, thereby effecting a mechanical connection between adjuster 1 and sleeve 9, which in turn holds the tensioner components together. Namely, adjuster 1 holds bearing 21 and arm 4 in pressing contact with base 8.

However, groove 91 is continuous about the inner circumference of the sleeve, and so adjuster 1 can still be rotated within sleeve 9 even when each member 51, 52 is engaged with groove 91.

Figure 5:
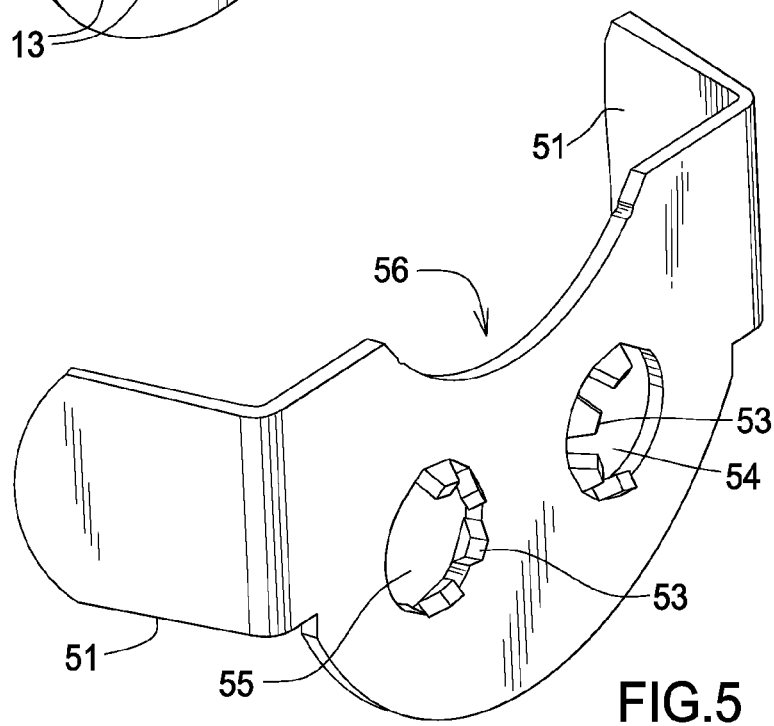
FIG. 5 is a perspective view of a retainer.

FIG. 5 is a perspective view of a retainer. Each tab 13 extends through a cooperating hole 54, 55. Projections 53 are bent slightly inward toward the hole to grip each tab 13 as retainer 5 is pressed onto adjuster 1. An arcuate cut 56 allows clearance for a fastener to be inserted through hole 12.

The terms recited in the claims should be given their ordinary and customary meaning as determined by reference to relevant entries. The appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing figures. However, it is to be understood that the subject matter described herein may assume various alternative orientations and, accordingly, such terms are not to be considered as limiting.

Unless otherwise indicated, all numbers or expressions, such as those expressing dimensions, physical characteristics, etc. used in the specification are understood as modified in all instances by the term "about." At the very least, and not as an attempt to limit the application of the doctrine of equivalents to the claims, each numerical parameter recited in the specification or claims which is modified by the term "about" should at least be construed in light of the number of recited significant digits and by applying ordinary rounding techniques.

Although a form of the invention has been described herein, it will be obvious to those skilled in the art that variations may be made in the construction and relation of parts without departing from the spirit and scope of the invention described herein.

We claim:

1. A tensioner comprising:
  a sleeve (9);
  an adjuster (1) cooperatively engaged with an inner surface (92) of the sleeve;
  a pivot arm (4) pivotally engaged with the sleeve;
  a pulley (2) journalled to the pivot arm;
  a torsion spring (6) engaged with the sleeve for urging the pivot arm;
  an elastomeric damping ring (7) connected to the arm and in compressive frictional contact between the sleeve and the arm whereby a tangential friction force damps a pivot arm movement, the elastomeric damping ring exerting a radial force on the sleeve; and
  a retaining member (5) connected to the adjuster and cooperatively engaged with the sleeve whereby the adjuster and sleeve are kept in a predetermined relation.

2. The tensioner as in claim 1, wherein the retaining member comprises a tab (51) which is spring loaded and which cooperatively engages a detent (91) in the sleeve.

3. The tensioner as in claim 1 further comprising an arm indicator (41) cooperatively disposed with a base indicator (81) to indicate a tensioner load condition.

4. The tensioner as in claim 1, wherein the adjuster is in temporary movable contact with the sleeve.

5. The tensioner as in claim 1, wherein the elastomeric damping ring comprises any natural or synthetic rubber or any combination thereof including but not limited to EVA (ethylene vinyl acetate), ACSM (acsium alkylated chlorosulfonated polyethylene), EEA (Vamac, ethylene/acrylic), FKM (fluoro elastomers), CR (Neoprene or polychloroprene), ECO (epichlorohydrin ethylene oxide), NBR (nitrile), MQ (silicone rubber) FVMQ (fluorosilicone rubber), CSM (chlorosulfonated polyethylene), CPE (chlorinated polyethylene), FFKM (perfluoroelastomer), OT or EDT (polysulfide), AU (polyester), EV (polyether), urethanes, PZ (phosphazene).

6. A tensioner comprising:
  a sleeve (9);
  an adjuster (1) cooperatively engaged with an inner surface (92) of the sleeve;
  a pivot arm (4) pivotally engaged with the sleeve;
  a pulley (2) journalled to the pivot arm;
  a torsion spring (6) engaged with the sleeve for urging the pivot arm;
  an elastomeric damping ring (7) connected to the arm and in compressive frictional contact between the sleeve and the arm whereby a tangential friction force damps a pivot arm movement, the elastomeric damping ring exerting a radial force on the sleeve;
  a retaining member (5) connected to the adjuster and cooperatively engaged with the sleeve whereby the adjuster and sleeve are kept in a predetermined relation; and
  the retaining member comprises a tab (51) which is spring loaded and which cooperatively engages a detent (91) in the sleeve.

7. The tensioner as in claim 6, wherein the elastomeric damping ring comprises any natural or synthetic rubber or any combination thereof including but not limited to EVA (ethylene vinyl acetate), ACSM (acsium alkylated chlorosulfonated polyethylene), EEA (Vamac, ethylene/acrylic), FKM (fluoro elastomers), CR (Neoprene or polychloroprene), ECO (epichlorohydrin ethylene oxide), NBR (nitrile), MQ (silicone rubber) FVMQ (fluorosilicone rubber), CSM (chlorosulfonated polyethylene), CPE (chlorinated polyethylene), FFKM (perfluoroelastomer), OT or EDT (polysulfide), AU (polyester), EV (polyether), urethanes, PZ (phosphazene).

* * * * *